US009840421B2

(12) United States Patent
Iiyama et al.

(10) Patent No.: US 9,840,421 B2
(45) Date of Patent: Dec. 12, 2017

(54) CHLOROSILANE PRODUCTION METHOD

(75) Inventors: Shouji Iiyama, Shunan (JP); Tomohiro Yamamoto, Shunan (JP); Yukihiro Takata, Shunan (JP); Shinichirou Koyanagi, Shunan (JP); Kanji Sakata, Shunan (JP)

(73) Assignee: TOKUYAMA CORPORATION, Shunan-Shi, Yamaguchi (JP)

( * ) Notice: Subject to any disclaimer, the term of this patent is extended or adjusted under 35 U.S.C. 154(b) by 869 days.

(21) Appl. No.: 13/132,956

(22) PCT Filed: Dec. 22, 2009

(86) PCT No.: PCT/JP2009/071835
§ 371 (c)(1),
(2), (4) Date: Jun. 6, 2011

(87) PCT Pub. No.: WO2010/074301
PCT Pub. Date: Jul. 1, 2010

(65) Prior Publication Data
US 2011/0236289 A1 Sep. 29, 2011

(30) Foreign Application Priority Data
Dec. 25, 2008 (JP) .................. 2008-330269

(51) Int. Cl.
*C01B 33/107* (2006.01)
*B01J 31/08* (2006.01)

(52) U.S. Cl.
CPC ...... *C01B 33/107* (2013.01); *C01B 33/10773* (2013.01); *B01J 31/08* (2013.01)

(58) Field of Classification Search
CPC ... C01B 33/04; C01B 33/107; C01B 33/1071; C01B 33/10773; B01J 31/08; B01J 41/046; B01J 37/0236
USPC .................... 423/341, 342, 344; 502/20, 514
See application file for complete search history.

(56) References Cited

U.S. PATENT DOCUMENTS

| 2,732,280 | A | * | 1/1956 | Bailey et al. | 423/342 |
| 4,113,845 | A | * | 9/1978 | Litteral | 423/342 |
| 4,610,858 | A | * | 9/1986 | Yamada et al. | 423/342 |
| 4,613,489 | A | * | 9/1986 | Morimoto | 423/342 |
| 4,667,048 | A | * | 5/1987 | Inoue et al. | 556/469 |
| 4,676,967 | A | * | 6/1987 | Breneman | 423/347 |
| 4,775,651 | A | * | 10/1988 | Tachikawa et al. | 502/159 |
| 5,118,485 | A | * | 6/1992 | Arvidson et al. | 423/342 |
| 5,869,017 | A |   | 2/1999 | Oda |  |
| 2009/0060819 | A1 | * | 3/2009 | Bill et al. | 423/342 |

FOREIGN PATENT DOCUMENTS

| EP | 0 216 640 A2 | 4/1987 |
| JP | 47-12569 | 6/1972 |
| JP | 10-59707 A | 3/1998 |
| JP | 11-29315 A | 2/1999 |
| JP | 2863774 B2 | 3/1999 |
| JP | 2000-218166 A | 8/2000 |
| JP | 2001-122609 A | 5/2001 |
| JP | 2001-131188 A | 5/2001 |

OTHER PUBLICATIONS

Grant & Hackh's Chemical Dictionary, Fifth edition, 1987, p. 192.*
Helmenstine, A.M. "Disproportionation Definition", taken from http://chemistry.about.com/od/chemistryglossary/g/Disproportionation-Definition.htm, Nov. 17, 2011, one page.*
Mukherjee el al "Comproportionation Reactions to Manganese (III/IV) Pivalate Clusters: A New Half-Integer Spin Single-Molecule Magnet", Inorg. Chem. 2013, 52, pp. 873-884.*
Chien et al, "Disproportionation and comproportionation reactions of resistive switching in polycrystalline NiOx films", Appl. Phys. Lett. 98, 153513, 2011, 3 pages.*
Taiwanese Office Action dated Dec. 26, 2013 for Application No. 098145096.
International Search Report for PCT/JP2009/071835 dated Mar. 23, 2010.
Extended European Search Report for Application No. 09835091.1 dated Apr. 2, 2015.

* cited by examiner

*Primary Examiner* — Ngoc-Yen Nguyen
(74) *Attorney, Agent, or Firm* — Birch, Stewart, Kolasch & Birch, LLP

(57) ABSTRACT

When a disproportionated chlorosilane is to be produced by causing a starting material chlorosilane liquid to flow through a catalyst-packed layer which is packed with a weakly basic anion exchange resin as a disproportionation reaction catalyst to carry out a disproportionation reaction, before the disproportionation reaction is carried out, the disproportionation reaction catalyst is brought into contact with a processing gas obtained by diluting a chlorosilane with an inert gas to prevent the deterioration of the disproportionation reaction catalyst at the start of the reaction so as to carry out the disproportionation of the chlorosilane efficiently.

6 Claims, No Drawings

CHLOROSILANE PRODUCTION METHOD

FIELD OF THE INVENTION

The present invention relates to a method of producing a chlorosilane by causing a chlorosilane liquid to flow through a catalyst-packed layer which is packed with a weakly basic anion exchange resin as a reaction catalyst. More specifically, it relates to a method of producing a chlorosilane by preventing the deterioration of the above reaction catalyst at the start of the reaction in the production of the above chlorosilane.

DESCRIPTION OF THE PRIOR ART

As means of producing a chlorosilane such as monochlorosilane, dichlorosilane, trichlorosilane or silicon tetrachloride which is used as an electronic material for semiconductors and a raw material for silicone resin, there are known methods making use of a disproportionation reaction. For example, there are proposed a method of producing dichlorosilane from trichlorosilane by using a disproportionation reaction catalyst composed of a basic anion exchange resin and a method of producing trichlorosilane and monosilane from silicon tetrachloride and dichlorosilane (JP-A 47-12569 and U.S. Pat. No. 2,863,774).

The above disproportionation reaction may be a gas-phase reaction in which a chlorosilane is reacted in a gaseous state or a liquid-phase reaction in which a chlorosilane is reacted in a liquid state.

However, it is known that, in all the above cases, when water is existent in the disproportionation reaction catalyst, a by-product such as silica or a silica precursor is formed by a reaction between water contained in the catalyst and a chlorosilane, and the occlusion of the pores of the catalyst particles and the coverage of the surfaces of the catalyst particles by the by-product occur, thereby reducing catalytic activity. Therefore, before the chlorosilane is brought into contact with the above disproportionation reaction catalyst, the catalyst must be dried completely until it contains substantially no water.

To dry the above disproportionation reaction catalyst, there are known a method in which the catalyst is packed into a fixed bed and an organic solvent that boils with water, such as toluene, is refluxed to extract water from the catalyst so as to remove water (refer to JP-A 47-12569) and a method in which water is removed by letting an inert gas such as a dry nitrogen gas pass through the above fixed bed for a long time (U.S. Pat. No. 2,863,774 and JP-A 2001-131188).

However, studies conducted by the inventors revealed that when a disproportionation reaction is carried out by causing a starting material chlorosilane liquid to flow through a catalyst-packed layer packed with a disproportionation reaction catalyst which has been dried by the above method, there occurs a phenomenon that a reduction in catalytic activity at the start of the reaction is large and the reaction rate does not increase fully thereafter. It was found that this problem becomes marked especially when the scale of the disproportionation reaction is large.

SUMMARY OF THE INVENTION

It is therefore an object of the present invention to provide a method of producing a chlorosilane by causing a starting material chlorosilane liquid to flow through a catalyst-packed layer which is packed with a weakly basic anion exchange resin as a reaction catalyst, wherein a reduction in catalytic activity in the initial stage of a reaction is small, and a stable reaction and a sufficiently high reaction rate are kept, thereby making it possible to produce a chlorosilane efficiently.

The inventors of the present invention conducted intensive studies to attain the above object and found that the cause of the deterioration of the reaction catalyst in the initial stage of the reaction is the occurrence of a sharp temperature rise in the catalyst-packed layer caused by heat generated when the chlorosilane is first brought into contact with the catalyst.

Based on this finding, the inventors conducted further studies and found that the concentration of the chlorosilane supplied into the catalyst-packed layer is adjusted by bringing the catalyst existent in the catalyst-packed layer into contact with a processing gas obtained by diluting a chlorosilane with an inert gas so as to suppress heat generated in the catalyst-packed layer and remove heat generated in the catalyst-packed layer with the inert gas, thereby making it possible to prevent a temperature rise caused by the residence of heat in the catalyst-packed layer.

Then, the inventors found that a reduction in catalytic activity in the initial stage of the above reaction can be prevented extremely effectively by these functions. The present invention was accomplished based on these findings.

That is, according to the present invention, the above object of the present invention is to provide a method of producing a trichloromonosilane, which comprises causing a starting material chlorosilane liquid comprising dichloromonosilane and silicon tetrachloride to flow through a catalyst-packed layer which is packed with a weakly basic anion exchange resin as a reaction catalyst for a reaction between dichloromonosilane and silicon tetrachloride to form trichloromonosilane, wherein the step of bringing the reaction catalyst contained in the catalyst-packed layer into contact with a processing gas obtained by diluting a silicon tetrachloride with an inert gas until a temperature rise in the catalyst-packed layer comes to an end and a step of cleaning the reaction catalyst that has been brought into contact with the processing gas by causing a silicon tetrachloride liquid to flow through the catalyst-packed layer before the starting material chlorosilane liquid is caused to flow for the reaction are carried out.

Solid matter such as silica is by-produced by a reaction between the chlorosilane contained in the processing gas or the chlorosilane and water contained in the catalyst, and the activity of the reaction catalyst is reduced by the occlusion of the pores of the catalyst particles and the coverage of the surfaces of the catalyst particles by the solid matter. Therefore, in the above chloromonosilane production method of the present invention, the above processing gas is supplied before the starting material chlorosilane liquid is caused to flow through the catalyst-packed layer to carry out the reaction. Preferably, a chlorosilane liquid is caused to flow through the catalyst-packed layer to clean it after that, thereby preventing a reduction in the activity of the catalyst caused by the solid matter.

Further, when the chlorosilane liquid which has been supplied into the catalyst-packed layer for cleaning is recycled as a cleaning liquid for cleaning the catalyst-packed layer after the solid matter is separated from the chlorosilane liquid, the amount of the chlorosilane liquid used for cleaning can be reduced advantageously.

PREFERRED EMBODIMENTS OF THE INVENTION (Reaction)

In the present invention, the term "reaction" means a reaction in which the dissociation and bonding of a Si—H bond and a Si—Cl bond occur among the molecules of a chlorosilane by causing a chlorosilane as a starting material to flow through a reaction catalyst, thereby re-distributing H and Cl on Si among molecules. More specifically, it is a reaction represented by the following reaction formula.

$$2SiHCl_3 \leftrightarrows SiH_2Cl_2 + SiCl_4$$

$$2SiH_2Cl_2 \leftrightarrows SiH_3Cl + SiHCl_3$$

$$2SiH_3Cl \leftrightarrows SiH_4 + SiH_2Cl_2$$

For example, when dichlorosilane is subjected to a reaction, monosilane and trichlorosilane are formed and further dichlorosilane and silicon tetrachloride are formed from trichlorosilane, and therefore the reaction product is a mixture of monosilane and various chlorosilanes.

Since the above reaction is an equilibrium reaction, the main target substance can be obtained at a high yield by adjusting the composition of the starting material chlorosilane. For example, to obtain trichlorosilane which is a starting material for the production of high-purity polycrystalline silicon by a Siemens method as the target substance, a mixture of chlorosilanes including at least dichlorosilane and silicon tetrachloride is preferably used as a starting material chlorosilane because trichlorosilane can be obtained efficiently.

(Starting Material Chlorosilane)

The starting material chlorosilane in the present invention is a chlorosilane used in the reaction, and examples thereof include hydrogenated chlorosilanes such as monochlorosilane, dichlorosilane and trichlorosilane. Since the reaction is an equilibrium reaction as shown by the above reaction formula, the chlorosilane of interest can be obtained at a high yield by adjusting the composition of the starting material chlorosilane. The starting material chlorosilane used for this purpose is a chlorosilane such as chloromonosilane exemplified by silicon tetrachloride.

As the above starting material chlorosilane, a chlorosilane which is acquired industrially may be used as it is, or a chlorosilane which is separated from a gas discharged at the time of producing polycrystalline silicon by the Siemens method by distillation may be used.

Further, as the starting material chlorosilane, the above hydrogenated chlorosilanes may be used alone or as a mixture of hydrogenated chlorosilanes or a mixture of a chlorosilane such as silicon tetrachloride and a hydrogenated chlorosilane. The starting material chlorosilane may be suitably selected according to the chlorosilane to be produced. For example, to obtain trichloromonosilane as a target substance, the starting material chlorosilane should be a mixture of chloromonosilanes including at least dichloromonosilane and silicon tetrachloride because trichloromonosilane can be obtained efficiently.

According to a preferred embodiment of the present invention, a mixture containing dichloromonosilane, trichloromonosilane and silicon tetrachloride is used as the starting material chlorosilane. This mixture preferably contains 2 to 50 mass % of dichloromonosilane, 2 to 45 mass % of trichloromonosilane and 4 to 96 mass % of silicon tetrachloride, more preferably 5 to 30 mass % of dichloromonosilane, 3 to 30 mass % of trichloromonosilane and 40 to 92 mass % of silicon tetrachloride based on the total weight of dichloromonosilane, trichloromonosilane and silicon tetrachloride.

In the present invention, the above starting material chlorosilane as a liquid is brought into contact with a catalyst-packed layer which is packed with a weakly basic anion exchange resin as a reaction catalyst (to be referred to as "catalyst-packed layer" hereinafter). When the chlorosilane used as the starting material chlorosilane is liquid at normal temperature and normal pressure, it may be used as it is. However, when the chlorosilane to be used is gaseous at normal temperature and normal pressure, it is liquefied or mixed with a high-boiling point chlorosilane to become liquid at normal temperature and normal pressure before use. Alternatively, the chlorosilane may be cooled to its boiling point or lower and supplied into the catalyst-packed layer in a liquid state.

(Reaction Catalyst)

In the chlorosilane production method of the present invention, a weakly basic anion exchange resin is used as a reaction catalyst (to be referred to as "reaction catalyst" hereinafter). The weakly basic anion exchange resin refers to an anion exchange resin obtained by introducing an amino group such as a primary, secondary or tertiary amino group as an ion exchange group into a matrix such as a styrene-divinylbenzene copolymer or an acrylic acid amide-divinylbenzene copolymer.

As the above reaction catalyst, a weakly basic anion exchange resin which can be acquired industrially may be used as it is, or the resin supporting a metal element may be used. Examples of the metal element to be supported by the weakly basic anion exchange resin include the group VIII metal elements of the periodic table such as platinum and palladium. To support the metal element, such steps as the preparation of a dispersion of the metal element, the impregnation of the weakly basic anion exchange resin with the dispersion and the removal of a solvent from the resin are required, thereby making the operation of preparing the reaction catalyst complex. Therefore, to produce the reaction catalyst industrially efficiently, it is preferred that the weakly basic anion exchange resin should be used as it is.

As for the reaction catalyst used in the present invention, examples of the weakly basic anion exchange resin having a tertiary amino group in a styrene-divinylbenzene copolymer as a matrix include Amberlyst A-21 and Amberlyst B-20·HG-DRY as a dry product of the Amberlyst A-21 (of Rohm and Haas Company), Diaion WA-30 (of Mitsubishi Chemical Corporation) and DOWEX MWA-1 (of Dow Chemical Company), and examples of the weakly basic anion exchange resin having a secondary amino group in a styrene-divinylbenzene copolymer as a matrix include Diaion WA-20 (of Mitsubishi Chemical Corporation). Out of these weakly basic anion exchange resins, weakly basic anion exchange resins having a tertiary amino group are preferred because they have a high reaction rate.

The structure of the above weakly basic anion exchange resin may be a gelled, porous, high porous or macroreticular (MR) structure. When handling ease such as the supply of the starting material chlorosilane or separation from the chlorosilane after the reaction is taken into consideration, porous, high porous or macroreticular (MR) particles are preferred, and spherical particles having a diameter of 0.1 to 2 mm are particularly preferred.

In the chlorosilane production method of the present invention, the above reaction catalyst is packed into a reactor such as a fixed-bed circulation reactor to form a catalyst-packed layer. The structure of the catalyst-packed layer is not particularly limited as long as the catalyst-packed layer is formed and a known structure can be suitably employed in consideration of production volume. In the reaction, in general, when the contact time with the reaction catalyst is the same, as the linear velocity becomes higher, the chances of contact between the molecules of the chlorosilane on the surface of the reaction catalyst grows, thereby increasing the yield of the target substance per unit time. When the linear velocity is the same, as the L/D (the ratio of the length to the diameter of the catalyst-packed layer) of the above catalyst-packed layer becomes larger, the amount of the catalyst required to obtain the same contact time becomes small, thereby making the reaction efficient. To carry out the reaction efficiently, the L/D of the catalyst-packed layer is preferably 2 to 200, more preferably 3 to 200.

(Drying of Reaction Catalyst)

The weakly basic anion exchange resin contains several mass % to several tens of mass % of water. When water is existent in the reaction catalyst at the time of carrying the reaction, the chlorosilane reacts with water, thereby by-producing solid matter such as silica. The occlusion of the pores of the above catalyst particles and the coverage of the surfaces of the catalyst particles by the by-produced solid matter occur, thereby reducing the reaction efficiency of the reaction. Therefore, when the reaction is carried out, the reaction catalyst is preferably dried to remove water contained in the catalyst as much as possible. However, to remove water contained in the reaction catalyst completely, water existent as essential water in the reaction catalyst must be removed. As the scale of the reaction becomes larger, the removal of this water becomes more difficult. Further, in the present invention, the above by-produced solid matter can be removed from the catalyst-packed layer by causing a processing gas obtained by diluting a chlorosilane with a gas inactive to this chloromonosilane to flow through the catalyst-packed layer and then preferably causing the chlorosilane liquid to flow for cleaning. Therefore, in the present invention, a water content of the weakly basic anion exchange resin of not more than 2.0 mass % before it is brought into contact with the processing gas suffices and is preferred.

To dry the above catalyst-packed layer, a commonly known drying method may be used without restriction. Examples of the drying method include a co-boiling dehydrating method in which water is removed by a reflux and extraction operation by supplying an organic solvent which boils with water, such as toluene, into the catalyst-packed layer, a method in which water is removed by supplying an inert gas such as a dry nitrogen gas into the catalyst-packed layer under normal pressure, and a vacuum drying method. Since the heatproof temperature of the weakly basic anion exchange resin used as a reaction catalyst is generally about 100° C. or lower, water can be removed efficiently at a relatively low temperature. Therefore, to dry the above catalyst-packed layer, the vacuum drying method is preferably employed.

The above vacuum drying conditions are suitably determined in consideration of the size and cooling capacity of a reactor such as a fixed-bed circulation reactor using a reaction catalyst and the amount of the packed catalyst. For example, vacuum drying is carried out at a temperature of 50° C. to the heatproof temperature of the resin and a pressure of not more than 30 kPa for 100 to 300 hours. Further, when vacuum drying is carried out while an inert gas such as a dry nitrogen gas is supplied into the above catalyst-packed layer, drying can be carried out more efficiently, which is most preferred.

The amount of water contained in the dried reaction catalyst can be checked by sampling part of the reaction catalyst to measure the amount of water.

(Processing Gas)

The greatest feature of the chlorosilane production method of the present invention is that a processing gas obtained by diluting a chlorosilane which may be the same or different from the starting material chlorosilane with an inert gas is brought into contact with the reaction catalyst contained in the catalyst-packed layer before the starting material chlorosilane liquid is caused to flow.

Before the start of the reaction of the chlorosilane, the catalyst existent in the above catalyst-packed layer is brought into contact with a processing gas having a low concentration of the chlorosilane obtained by diluting the chlorosilane with an inert gas so as to control the amount of the chlorosilane to be brought in contact with the catalyst-packed layer, thereby suppressing heat generated in the catalyst-packed layer and removing heat generated in the catalyst-packed layer with the above inert gas so that a temperature rise caused by the residence of the heat in the catalyst-packed layer can be prevented. A reduction in the activity of the catalyst in the initial stage of the reaction can be prevented extremely effectively by these functions.

The chlorosilane used in the above processing gas may be the same or different from the starting material chlorosilane. As the chlorosilane may be used a chlorosilane such as a hydrogenated chlorosilane or silicon tetrachloride described for the starting material chlorosilane without restriction. The chlorosilane which is different from the starting material chlorosilane refers to a chlorosilane of chemical species different from the chemical species of the starting material chlorosilane or a chlorosilane which is the same in chemical species as the starting material chlorosilane but different in chemical species ratio. As described above, a chlorosilane of single chemical species or a mixture of chlorosilanes of different chemical species may be used as the chlorosilane.

Out of the chlorosilanes which may be used in the above processing gas, it is most preferred to use silicon tetrachloride alone because heat is not generated by the reaction, the amount of heat generated in the catalyst-packed layer can be further suppressed, and it is relatively safe and easy to handle.

The gas used to dilute the above chlorosilane (to be referred to as "dilution gas" hereinafter) is not particularly limited as long as it is inactive to the chlorosilane, and a commonly known inert gas may be used. Examples of the dilution gas include nitrogen, helium and argon. Since the chlorosilane reacts with water to form a by-product such as silica as described above, the above dilution gas is preferably a completely dried gas and caused to flow together with a dessicant before it is supplied into the reactor to adjust its dew point to lower than 0° C., preferably −30° C. or lower.

The concentration of the chlorosilane in the above processing gas and the supply rate are suitably determined in consideration of the size and cooling capacity of a reactor such as a fixed-bed circulation reactor to be packed with the reaction catalyst and the amount of the packed catalyst so as to prevent the decomposition of the reaction catalyst. The concentration of the chlorosilane may be fixed during the supply of the processing gas into the catalyst-packed layer or gradually increased by checking the temperature of the reaction catalyst in the catalyst-packed layer by using a low-concentration processing gas at the beginning of supply. Further, the supply rate of the chlorosilane may be fixed during the supply of the processing gas into the catalyst-packed layer, or made low at the beginning of supply and gradually increased by checking the temperature of the reaction catalyst in the catalyst-packed layer. The concentration of the chlorosilane in the above processing gas is preferably 0.01 to 50 vol %, more preferably 0.1 to 30 vol %. The supply rate is preferably 0.05 to 5.0 cm/s, more preferably 0.1 to 1.0 cm/s in terms of linear velocity.

The temperature of the processing gas is suitably determined in consideration of the size and cooling capacity of a reactor such as a fixed-bed circulation reactor to be packed with the reaction catalyst and the amount of the packed catalyst so as to prevent the decomposition of the reaction catalyst. However, when a processing gas having a too high temperature is used, the difference between the temperature of the processing gas and the heatproof temperature of the reaction catalyst becomes too small, thereby making it difficult to control the temperature of the catalyst-packed layer during the passage of the processing gas and when a processing gas having a too low temperature is used, an apparatus for cooling it is required, which is not efficient. The temperature of the processing gas is preferably 0 to 80° C., more preferably 10 to 30° C.

When the processing gas is supplied into the catalyst-packed layer, the chlorosilane comes into contact with the reaction catalyst from the supply position side of the processing gas, and heat is generated by contact, thereby raising the temperature of the catalyst-packed layer. After the chlorosilane comes into full contact with the reaction catalyst, the temperature of the catalyst-packed layer lowers. Therefore, it is preferred that the supply of the processing gas into the catalyst-packed layer should be continued until a temperature rise in the catalyst-packed layer at the exhaust position of the processing gas comes to an end by measuring the temperature of the catalyst-packed layer near the exhaust position of the processing gas with time.

(Cleaning with Chlorosilane Liquid)

In the chlorosilane production method of the present invention, after the above processing gas is brought into contact with the catalyst-packed layer which is packed with the reaction catalyst, a chlorosilane liquid is preferably caused to flow through the catalyst-packed layer for cleaning.

In the present invention, in order to remove a by-product of a reaction between the chlorosilane contained in the processing gas and water contained in the catalyst-packed layer from the catalyst-packed layer before the reaction, it is preferred that the catalyst-packed layer should be cleaned by causing the chlorosilane liquid to flow before the starting material chlorosilane liquid from the viewpoint of the prevention of a reduction in the catalytic activity of the catalyst caused by the above by-product.

As the chlorosilane liquid for cleaning to be caused to flow before the starting material chlorosilane liquid may be used the chlorosilanes described for the starting material chlorosilane without restriction. As a matter of course, the chlorosilanes may be used alone or as a mixture. As the chlorosilane for cleaning, use of silicon tetrachloride is preferred because the chlorosilane discharged at the time of producing polycrystalline silicon can be reused and silicon tetrachloride is liquid at normal pressure, relatively safe and easy to handle. Particularly when the chlorosilane to be produced by the reaction is trichlorosilane, the content of silicon tetrachloride in the starting material chlorosilane should be made high because trichlorosilane is easily obtained at a high yield by the reaction. Therefore, the chlorosilane adsorbed to the reaction catalyst before the supply of the starting material chlorosilane is preferably silicon tetrachloride, and use of silicon tetrachloride alone is most preferred in this respect.

To cause the chlorosilane liquid to flow through the catalyst-packed layer, there are a batch flow method in which the catalyst-packed layer is filled with the chlorosilane liquid and the chlorosilane liquid is discharged after a predetermined period of time and a continuous flow method in which the chlorosilane liquid is supplied at a fixed rate and caused to flow through the catalyst-packed layer continuously. Out of these flow methods, the continuous flow method is preferred because the above by-product can be discharged efficiently by a flow of the chlorosilane liquid supplied into the catalyst-packed layer packed with the reaction catalyst.

The flow temperature of the chlorosilane liquid in the above continuous flow method is not particularly limited as long as it does not affect the reaction of the starting material chlorosilane liquid and suitably determined in consideration of the size of the reactor and the amount of the packed catalyst. However, when there is a very big difference between the flow temperature of the chlorosilane liquid for cleaning and the flow temperature of the starting material chlorosilane liquid into the catalyst-packed layer, it affects the reaction rate of the reaction or when a hydrogenated chlorosilane such as dichlorosilane or monochlorosilane is used as the chlorosilane liquid for cleaning, heat is generated by the reaction of this hydrogenated chlorosilane. Therefore, the temperature of the chlorosilane liquid for cleaning is preferably 0° C. to the heatproof temperature of the catalyst, more preferably 20 to 50° C.

When the flow rate of the chlorosilane liquid is too low, the removal efficiency of a by-product such as silica and silica precursor remaining in the catalyst-packed layer becomes low and long-time flow is required to remove the by-product from the catalyst-packed layer disadvantageously. When the flow rate is too high, the removal efficiency of the by-product is almost the same. Therefore, the flow rate of the chlorosilane liquid is preferably 1 to 10 m/h, more preferably 4 to 8 m/h in terms of linear velocity.

Although the chlorosilane discharged from the catalyst-packed layer can be discarded after it is properly disposed of in the continuous flow method, to reduce the amount of the chlorosilane liquid used for cleaning, the chlorosilane liquid is preferably reused as a cleaning liquid for the catalyst-packed layer after solid matter such as silica is separated from the chlorosilane liquid caused to flow through the catalyst-packed layer.

(Means of Separating Solid Matter)

In the above continuous flow method, the chlorosilane liquid after cleaning discharged from the catalyst-packed layer contains solid matter. The above solid matter contains solid matter such as silica by-produced by a reaction between the chlorosilane contained in the above processing gas and water contained in the reaction catalyst and ammonium chloride by-produced by a reaction between hydrogen chloride generated by a reaction between chlorosilanes and a trace amount of a free amine existent in the weakly basic anion exchange resin as a reaction catalyst or iron chloride by-produced by a reaction between the above hydrogen chloride and iron as the material of a reactor. These solid matter can be separated from the chlorosilane liquid by separation means. When the chlorosilane liquid is to be reused and recycled, after the solid matter such as silica is separated from the chlorosilane liquid which has been caused to flow through the catalyst-packed layer, the chlorosilane liquid is preferably recycled to the catalyst-packed layer as a cleaning liquid.

As the means of separating the solid matter, any means capable of separating the above solid matter such as silica and ammonium chloride from the chlorosilane liquid may be used, and commonly known separation means may be employed. More specifically, the solid matter is removed by a filter, a strainer or a tower filled with a filler. The materials of the filter and the strainer are not particularly limited as long as corrosion by the chlorosilane liquid flowing therethrough does not occur, and a metal element such as stainless steel may be used. The mesh size for removing the by-product is preferably 100 to 60 mesh. Any known filler may be used as the filler used to separate the solid matter with the tower as long as the above solid matter can be removed from the chlorosilane liquid. Examples of the filler include silica, silica gel, activated alumina, activated carbon, activated carbon fibers, molecular sieving carbon and zeolite.

The above separation means may be used alone or in combination. When the particle diameter of the by-produced solid matter is very small, the solid matter may pass through separation means such as a filter or strainer and affect the subsequent step. Therefore, it is preferred from the viewpoint of the high separation efficiency of the solid matter that the chlorosilane liquid containing the solid matter should be first let pass through separation means such as a filter or strainer to separate solid matter having a relatively large particle diameter and then should be let pass through a tower filled with the above filler to separate solid matter having a very small particle diameter.

(Reaction Conditions)

In the present invention, as the reaction conditions under which the starting material chlorosilane liquid is caused to flow through the reaction catalyst to be reacted, commonly known reaction conditions can be used without restriction as reaction conditions for carrying out a reaction as a liquid-phase reaction. Therefore, the above reaction conditions are suitably determined according to the type of the chlorosilane to be produced. In consideration of reaction efficiency, the temperature range is from room temperature to the heatproof temperature of the reaction catalyst, for example, 20 to 100° C., and the pressure range is preferably from atmospheric pressure to 5 MPa. It is preferred that when a chlorosilane which is gaseous at normal temperature and normal pressure is cooled to its boiling point or lower and used in a liquid state as the starting material chlorosilane liquid, the reaction catalyst should be cooled to the boiling point of the starting material chlorosilane liquid or lower before the starting material chlorosilane liquid is caused to flow through the reaction catalyst because the gasification of the starting material chlorosilane in the catalyst-packed layer which is packed with the reaction catalyst is suppressed.

The contact time between the starting material chlorosilane liquid and the reaction catalyst when the starting material chlorosilane liquid is caused to flow through the reaction catalyst is desirably set to such an extent that the reaction system reaches almost equilibrium composition. When the contact time is too short, the reaction does not proceed fully with the result of a low yield of the target substance. When the contact time is longer than required, since equilibrium composition is fully reached, the yield of the target substance based on the starting material does not change but the proportion of the target substance does not become more than the equilibrium composition with the result of a low yield of the target substance per unit time. The suitable contact time differs according to the reaction temperature, pressure, raw material, catalyst and other factors but preferably 1 to 60 minutes.

(Operation after Reaction)

The product obtained by the above reaction is a mixture of chlorosilanes of different chemical species. This product can be used as a starting material in the production method of the present invention, or chlorosilanes of interest can be obtained by purification through distillation making use of the boiling points of chlorosilanes. Alternatively, the product can be further purified by passing through activated carbon as required.

The product obtained after the reaction of the present invention is preferably a mixture containing 0 to 47 mass % of dichloromonosilane, 6 to 94 mass % of trichloromonosilane and 0 to 94 mass % of silicon tetrachloride, more preferably 1 to 6 mass % of dichloromonosilane, 15 to 54 mass % of trichloromonosilane and 40 to 86 mass % of silicon tetrachloride when a mixture containing dichloromonosilane, trichloromonosilane and silicon tetrachloride described in the above preferred embodiment is used as the starting material chlorosilane.

As described above, according to the present invention, it is understood that there are provided a method of producing a chlorosilane and a method of bringing a processing gas obtained by diluting a chlorosilane with an inert gas into contact with a catalyst-packed layer which is packed with a weakly basic anion exchange resin as a reaction catalyst for chlorosilanes as a pretreatment method before the reaction of the chlorosilane by means of the reaction catalyst.

EXAMPLES

The following examples are provided for the purpose of further illustrating the present invention but are in no way to be taken as limiting.

As for the method of measuring the water content of the reaction catalyst, the sampled reaction catalyst is dried at 105° C. for 75 hours while a nitrogen gas is caused to flow through the reaction catalyst and the amount of water is calculated from the difference in weight before and after drying.

Example 1

(1) A catalyst-packed layer having an inner diameter of 0.1 m and a height of 3.0 m was packed with 10 kg (about 26 liters) of a basic anion exchange resin having a tertiary amine group in a styrene-divinylbenzene copolymer as a matrix (trade name; Amberlyst B-20·HG-DRY of Rohm and Haas Company) as a disproportionation reaction catalyst. The catalyst was wholly heated at 80° C. while a nitrogen gas was caused to flow through the catalyst-packed layer at a rate of 5 L/min to be vacuum dried at 20 kPa for 200 hours. The amount of water contained in the catalyst after drying was 1.1 mass %.

(2) After drying, the catalyst-packed tower was left to cooled so as to reduce the temperature of the catalyst-packed layer to 25° C. or lower. Thereafter, a nitrogen diluted gas containing 0.3 vol % of silicon tetrachloride as a processing gas was caused to flow through the catalyst after drying at a gas temperature of 25° C., a flow rate of 0.08 L/h (linear velocity: 1.0 cm/hr) and a pressure of 0.02 MPa. When the temperature of the catalyst was measured with a thermometer installed near the gas exhaust port of the catalyst-packed layer, it was raised up to 42° C. Since the measurement value of the above thermometer dropped after the processing gas was caused to flow for 300 hours, the supply of the processing gas was terminated.

(3) Then, a silicon tetrachloride liquid was caused to flow through the above catalyst-packed layer at a temperature of 50° C., a flow rate of 50 L/h (linear velocity of 6.4 m/h) and a pressure of 0.1 MPa. The silicon tetrachloride liquid discharged from the catalyst-packed layer was recycled to the catalyst-packed layer through a strainer having a mesh size of 60. The maximum temperature of the catalyst-packed layer at the time of recycling was 51° C.

When the above recycling was continued for 100 hours, the amount of solid matter collected by the strainer was 1.0 kg.

(4) A mixture containing 20 mass % of dichloromonosilane (DCS), 10 mass % of trichloromonosilane (TCS) and 70 mass % of silicon tetrachloride (STC) as the starting material chlorosilane liquid was caused to flow through the catalyst-packed layer to which the silicon tetrachloride liquid had been recycled at a temperature of 50° C., a flow rate of 40 L/h (linear velocity of 5.1 m/h) and a pressure of 0.1 MPa to start a reaction.

When a liquid distilled out from the catalyst-packed layer 40 minutes after the start of the flow of the starting material chlorosilane liquid was analyzed by gas chromatography, the conversion of dichloromonosilane was 90%. When a distillate obtained after the starting material chloromonosilane was caused to flow for 100 hours was analyzed by gas chromatography, the conversion of dichloromonosilane was 90%. The analytical results of the distillate are shown in Table 1 below. The conversion (%) of dichloromonosilane was obtained from the following equation.

{DCS in starting material gas(mass %)−DCS contained in exhaust gas(mass %)}/DCS in starting material gas(mass %)×100

The maximum temperature of the catalyst-packed layer during the flow of the above starting material chlorosilane was 60° C.

When a liquid distilled out from the catalyst-packed layer was collected by a strainer having a mesh size of 60, the amount of solid matter collected by the strainer was 0.1 kg.

Example 2

When an experiment was conducted in the same manner as in Example 1 except that vacuum drying was carried out at 80° C. and 20 kPa for 300 hours and the amount of water contained in the catalyst before the processing gas was caused to flow through the reaction catalyst was 0.8 mass % in the step (1) of Example 1, the amount of solid matter collected by the strainer was 0.8 kg. When a liquid distilled out from the catalyst-packed layer 40 minutes after the start of the flow of the starting material chlorosilane liquid was analyzed, the conversion of dichloromonosilane was 89%. Further, when a distillate obtained after the starting material chlorosilane liquid was caused to flow for 100 hours was analyzed, the conversion of dichloromonosilane was 89%. The analytical results of the distillate are shown in Table 1 below.

When a liquid distilled out from the catalyst-packed layer was collected by a strainer, the amount of solid matter collected by the strainer was less than 0.1 kg.

Example 3

An experiment was conducted in the same manner as in Example 1 except that a catalyst-packed tower was packed with a silicon tetrachloride liquid and the silicon tetrachloride liquid was discharged in place of recycling after the passage of 350 hours in the step (3) of Example 1. The amount of solid matter contained in the silicon tetrachloride liquid discharged from the catalyst-packed tower was 0.1 kg.

When a liquid distilled out from the catalyst-packed layer 40 minutes after the start of the flow of the starting material chlorosilane liquid was analyzed, the conversion of dichloromonosilane was 72%. Further, when a distillate obtained after the starting material chlorosilane liquid was caused to flow for 100 hours was analyzed, the conversion of dichloromonosilane was 90%. The analytical results of the distillate are shown in Table 1 below.

When the liquid distilled out from the catalyst-packed layer was collected by a strainer, the amount of solid matter collected by the strainer was 1.0 kg.

Example 4

(1) A catalyst-packed layer having an inner diameter of 0.1 m and a height of 3.0 m was packed with 10 kg (about 26 liters) of a basic anion exchange resin having a tertiary amine group in a styrene-divinylbenzene copolymer as a matrix (trade name; Amberlyst B-20·HG-DRY of Rohm and Haas Company) as a reaction catalyst. The catalyst was wholly heated at 80° C. while a nitrogen gas was supplied at a rate of 5 L/min to be vacuum dried at 20 kPa for 100 hours. The amount of water contained in the catalyst after drying was 1.5 mass %.

(2) After drying, the catalyst-packed tower was left to be cooled to reduce the temperature of the catalyst-packed layer to 25° C. or lower. Thereafter, a nitrogen diluted gas containing 0.3 vol % of dichloromonosilane as a processing gas was caused to flow through the catalyst after drying at a gas temperature of 25° C., a flow rate of 0.08 L/h (linear velocity: 1.0 cm/h) and a pressure of 0.02 MPa. When the temperature of the catalyst was measured with a thermometer installed near the gas exhaust port of the catalyst-packed layer, it was raised up to 47° C. Since the measurement value of the above thermometer dropped after the processing gas was caused to flow for 300 hours, the flow of the processing gas was terminated.

(3) Then, a silicon tetrachloride liquid was caused to flow through the above catalyst-packed layer at a temperature of 50° C., a flow rate of 50 L/h (linear velocity of 6.4 m/h) and a pressure of 0.1 MPa. The silicon tetrachloride liquid discharged from the catalyst-packed layer was recycled to the catalyst-packed layer through a strainer having a mesh size of 60. The maximum temperature of the catalyst-packed layer at the time of recycling was 50° C.

When the above recycling was continued for 100 hours, the amount of solid matter collected by the strainer was 0.1 kg.

(4) A mixture containing 20 mass % of dichloromonosilane, 10 mass % of trichloromonosilane and 70 mass % of silicon tetrachloride as the starting material chlorosilane liquid was caused to flow through the catalyst-packed layer to which the silicon tetrachloride liquid had been recycled at a temperature of 50° C., a flow rate of 40 L/h (linear velocity of 5.1 m/h) and a pressure of 0.1 MPa to start a reaction.

When a liquid distilled out from the catalyst-packed layer 40 minutes after the start of the flow of the starting material chlorosilane liquid was analyzed, the conversion of dichloromonosilane was 91%. When a distillate obtained after the starting material chlorosilane liquid was caused to flow for 100 hours was analyzed, the conversion of dichloromonosilane was 91%. The analytical results of the distillate are shown in Table 1 below. The maximum temperature of the catalyst-packed layer during the flow of the above starting material chlorosilane liquid was 60° C.

When a liquid distilled out from the catalyst-packed layer was collected by a strainer having a mesh size of 60, the amount of solid matter collected by the strainer was less than 0.1 kg.

Comparative Example 1

(1) A catalyst-packed tower having an inner diameter of 0.1 m and a height of 3.0 m was packed with 10 kg (about 2.6 liters) of a basic anion exchange resin having a tertiary amine group in a styrene-divinylbenzene copolymer as a matrix (trade name; Amberlyst B-20·HG-DRY of Rohm and Haas Company) as a disproportionation reaction catalyst. The catalyst was wholly heated at 80° C. while a nitrogen gas was supplied at a rate of 5 L/min to be vacuum dried at 20 kPa for 200 hours. The amount of water contained in the catalyst after drying was 1.2 mass %.

(2) After drying, the catalyst-packed tower was left to be cooled to reduce the catalyst-packed layer to 50° C. or lower. Thereafter, a mixture containing 20 mass % of dichloromonosilane, 10 mass % of trichloromonosilane and 70 mass % of silicon tetrachloride was caused to flow as the starting material chlorosilane liquid at a temperature of 50° C., a flow rate of 40 L/h (linear velocity of 5.1 m/h) and a pressure of 0.1 MPa to start a reaction.

The inside temperature of the catalyst-packed layer at the start of the reaction was raised up to 90° C. When a liquid distilled out from the catalyst-packed layer 30 minutes after the start of the flow of the starting material chlorosilane liquid was analyzed, the conversion of dichloromonosilane was 60%. Further, when the distillate obtained after the starting material chlorosilane liquid was caused to flow for 100 hours was analyzed, the conversion of dichloromonosilane was 78%. The analytical results of the distillate are shown in Table 1 below.

When a liquid distilled out from the catalyst-packed layer was collected by a strainer having a mesh size of 60, the amount of solid matter collected by the strainer was 1.0 kg. When the catalyst-packed tower packed with the catalyst was opened after the end of the reaction, it was confirmed that the catalyst became black, which was assumed to be due to the deterioration of the catalyst. Although the maximum temperature at the time of the reaction was below the heatproof temperature of the reaction catalyst, a temperature rise above the heatproof temperature occurred locally, which was assumed to be due to the deterioration of the catalyst.

TABLE 1

| | | Conversion % | Mass % of DCS | Mass % of TCS | Mass % of STC |
|---|---|---|---|---|---|
| Starting material | | — | 20 | 10 | 70 |
| Example 1 | | 90 | 2 | 58 | 40 |
| Example 2 | | 89 | 2 | 58 | 40 |
| Example 3 | Beginning | 72 | 6 | 48 | 46 |
| | End | 90 | 2 | 58 | 40 |
| Example 4 | | 91 | 2 | 58 | 40 |
| Comparative Example 1 | Beginning | 60 | 8 | 42 | 50 |
| | End | 78 | 4 | 52 | 44 |

The contents of monochloromonosilane and monosilane in the distillates of the above Examples and Comparative Examples were less than 0.01 mass %.

Example 5

After the catalyst-packed layer to which the silicon tetrachloride liquid had been recycled was cooled to −10° C., a reaction was started by causing liquefied dichloromonosilane cooled to −10° C. as the starting material chlorosilane liquid to flow at a temperature of −10° C., a flow rate of 40 L/h (linear velocity of 5.1 m/h) and a pressure of 0.1 MPa in the step (4) of Example 1.

When a liquid distilled off from the catalyst-packed layer 40 minutes after the start of the flow of the liquefied dichloromonosilane was analyzed, the conversion of dichloromonosilane was 90%. Further, when a distillate obtained after the liquefied dichloromonosilane was caused to flow for 100 hours was measured, the conversion of dichloromonosilane was 90%. As for the composition of the distillate, the distillate contained 4 mass % of monochloromonosilane, 10 mass % of dichloromonosilane and 86 mass % of trichloromonosilane. The contents of monosilane and silicon tetrachloride were less than 0.01 mass %.

When a liquid distilled out from the catalyst-packed layer was collected by a strainer, the amount of solid matter collected by the strainer was less than 0.1 kg.

Example 6

An experiment was conducted in the same manner as in Example 1 except that trichloromonosilane was used as the starting material chlorosilane liquid in the step (4) of Example 1.

When trichloromonosilane was caused to flow for 100 hours 40 minutes after the start of the flow of trichlorosilane and then a liquid distilled off from the catalyst-packed layer was analyzed, the conversion of trichloromonosilane was 20%. As for the composition of the distillate, the distillate contained 7.5 mass % of dichlorosilane, 80 mass % of trichloromonosilane and 12.5 mass % of silicon tetrachloride. The contents of monosilane and monochloromonosilane were less than 0.01 mass %.

When a liquid distilled off from the catalyst-packed layer was collected by a strainer, the amount of solid matter collected by the strainer was less than 0.1 kg.

Examples 7 to 9

Experiments were conducted in the same manner as in Example 1 except that the starting material chlorosilane liquid shown in Table 2 was used in the step (4) of Example 1. In all the Examples, the starting material chlorosilane liquid was caused to flow for 100 hours 40 minutes after the start of the flow of the starting material chlorosilane liquid and then the obtained distillate was analyzed by gas chromatography. The analytical results of the distillates are shown in Table 2.

TABLE 2

| | | Conversion % | Mass % of DCS | Mass % of TCS | Mass % of STC |
|---|---|---|---|---|---|
| Example 7 | Starting material | — | 30 | 0 | 70 |
| | Distillate | 90 | 3 | 72 | 25 |
| Example 8 | Starting material | — | 5 | 5 | 90 |
| | Distillate | 80 | 1 | 17 | 82 |
| Example 9 | Starting material | — | 40 | 40 | 20 |
| | Distillate | 42.5 | 23 | 72 | 5 |

Examples 10 to 12

A reaction was carried out in the same manner as in Example 1 except that a weakly basic anion exchange resin comprising a styrene-divinylbenzene copolymer as a matrix and having an exchange group shown in Table 3 was used as the weakly basic anion exchange resin.

As a result, the same results as in Example 1 were obtained.

TABLE 3

|  | Ion exchange resin | Exchange group |
|---|---|---|
| Example 10 | Diaion WA-20 (Mitsubishi Chemical Corporation) | Secondary amine group |
| Example 11 | Diaion WA-30 (Mitsubishi Chemical Corporation) | Tertiary amine group |
| Example 12 | DOWEX MWA-1 (Dow Chemical Company) | Tertiary amine group |

As described above, according to the present invention, when a chlorosilane is to be produced by causing a starting material chlorosilane liquid to flow through a catalyst-packed layer which is packed with a weakly basic anion exchange resin as a reaction catalyst to carry out a reaction, a sharp temperature rise in the catalyst-packed layer at the start of the reaction can be suppressed and the deterioration of the reaction catalyst by heat can be prevented by bringing the catalyst contained in the above catalyst-packed layer into contact with a processing gas obtained by diluting a chlorosilane with an inert gas, thereby making it possible to produce a chlorosilane efficiently. Although the cause of the sharp temperature rise in the catalyst-packed layer at the start of the reaction is not exactly known, it is assumed to be a reaction between the chlorosilane and water remaining in the reaction catalyst or heat generated by adsorption heat when the chlorosilane is adsorbed to the reaction catalyst. In the present invention, heat generated in the catalyst-packed layer is suppressed by bringing the reaction catalyst into contact with the processing gas obtained by diluting the chlorosilane with an inert gas to adjust the concentration of the chlorosilane to be supplied into the catalyst-packed layer, and heat generated in the catalyst-packed layer is removed by causing the inert gas to flow through the catalyst-packed layer, thereby making it possible to prevent a temperature rise caused by the residence of the heat in the catalyst-packed layer.

The invention claimed is:

1. A method of producing a trichloromonosilane, which comprises
   flowing a starting material chlorosilane liquid comprising dichloromonosilane and silicon tetrachloride through a catalyst-packed layer which is packed with a weakly basic anion exchange resin as a reaction catalyst to react dichloromonosilane and silicon tetrachloride to form trichloromonosilane,
   wherein a step of bringing the reaction catalyst contained in the catalyst-packed layer into contact with a processing gas obtained by diluting a silicon tetrachloride with an inert gas until a temperature rise in the catalyst-packed layer comes to an end and a step of cleaning the reaction catalyst that has been brought into contact with the processing gas by flowing a silicon tetrachloride liquid through the catalyst-packed layer to remove solid matter are carried out before flowing the starting material chlorosilane liquid through the catalyst-packed layer.

2. The production method according to claim 1, wherein the reaction mixture obtained after the reaction is carried out has a higher content of trichlorosilane than the starting material chlorosilane.

3. The production method according to claim 1, wherein solid matter is separated from the silicon tetrachloride liquid after the cleaning step and then the silicon tetrachloride liquid is reused to clean the catalyst-packed layer.

4. A method of producing a trichloromonosilane, which comprises
   contacting a catalyst-packed layer which is packed with a weakly basic anion exchanger resin as a reaction catalyst for a reaction between dichloromonosilane and silicon tetrachloride with a processing gas obtained by diluting a silicon tetrachloride with an inert gas until a temperature rise in the catalyst-packed layer comes to an end,
   cleaning the reaction catalyst that has been brought into contact with the processing gas by flowing a silicon tetrachloride liquid to flow through the catalyst packed layer, and
   after the cleaning step, flowing a starting material chlorosilane liquid comprising dichloromonosilane and silicon tetrachloride through the catalyst-packed layer to react dichloromonosilane and silicon tetrachloride to form trichloromonosilane.

5. The production method according to claim 1, wherein the starting material chlorosilane liquid further comprises trichloromonosilane.

6. The production method according to claim 4, wherein the starting material chlorosilane liquid further comprises trichloromonosilane.

* * * * *